United States Patent
Kumar et al.

(10) Patent No.: US 10,649,935 B2
(45) Date of Patent: *May 12, 2020

(54) DEFERRED INTER-PROCESSOR INTERRUPTS

(71) Applicant: Apple Inc., Cupertino, CA (US)

(72) Inventors: Derek R. Kumar, Sunnyvale, CA (US); Joshua Phillips de Cesare, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,478

(22) Filed: Nov. 19, 2018

(65) Prior Publication Data

US 2019/0155770 A1 May 23, 2019

Related U.S. Application Data

(63) Continuation of application No. 14/867,770, filed on Sep. 28, 2015, now Pat. No. 10,152,438, which is a continuation of application No. 13/741,811, filed on Jan. 15, 2013, now Pat. No. 9,208,113.

(51) Int. Cl.
*G06F 13/24* (2006.01)
*G06F 1/3293* (2019.01)
*G06F 9/4401* (2018.01)

(52) U.S. Cl.
CPC ............ *G06F 13/24* (2013.01); *G06F 1/3293* (2013.01); *G06F 9/4418* (2013.01); *Y02D 10/14* (2018.01)

(58) Field of Classification Search
CPC ....... G06F 13/24; G06F 1/3293; G06F 9/4418
USPC ......................................................... 710/262
See application file for complete search history.

(56) References Cited

U.S. PATENT DOCUMENTS

| | | | | |
|---|---|---|---|---|
| 5,363,506 A | * | 11/1994 | Fukuoka | G06F 9/4812 710/267 |
| 5,708,817 A | * | 1/1998 | Ng | G06F 13/24 710/260 |
| 5,745,704 A | | 4/1998 | Yasukawa | |
| 5,881,296 A | | 3/1999 | Williams et al. | |
| 6,115,776 A | * | 9/2000 | Reid | H04L 12/40032 709/230 |
| 6,115,779 A | * | 9/2000 | Haubursin | G06F 13/24 710/260 |
| 6,792,492 B1 | | 9/2004 | Griffin | |
| 7,117,285 B2 | | 10/2006 | Ota | |
| 7,415,561 B2 | | 8/2008 | Jinzaki | |
| 7,433,985 B2 | | 10/2008 | Ayyar et al. | |
| 7,509,639 B2 | | 3/2009 | Worley, Jr. | |
| 7,852,777 B2 | | 12/2010 | Maruoka et al. | |
| 7,899,966 B2 | | 3/2011 | Kulkarni | |
| 7,913,009 B2 | | 3/2011 | Vega et al. | |

(Continued)

*Primary Examiner* — Paul R. Myers
(74) *Attorney, Agent, or Firm* — Womble Bond Dickinson (US) LLP

(57) ABSTRACT

A data processing system includes, in one embodiment, at least a first processor and a second processor and an interrupt controller, and the system provides a deferred inter-processor interrupt (IPI) that can be used to wake up the second processor from a low power sleep state. The deferred IPI is, in one embodiment, delayed by a timer in the interrupt controller, and the deferred IPI can be cancelled by the first processor if the first processor becomes available to execute a thread that was made runnable by an interrupt which triggered the deferred IPI.

8 Claims, 4 Drawing Sheets

(56) References Cited

U.S. PATENT DOCUMENTS

| | | |
|---|---|---|
| 8,260,996 B2 | 9/2012 | Wolfe |
| 8,843,910 B1 | 9/2014 | Schwerin et al. |
| 2004/0107416 A1 | 6/2004 | Buban et al. |
| 2004/0236875 A1* | 11/2004 | Jinzaki .................. G06F 9/4812 |
| | | 710/15 |
| 2005/0086547 A1 | 4/2005 | Kobayashi et al. |
| 2005/0268016 A1* | 12/2005 | Mowry ................... G06F 13/24 |
| | | 710/260 |
| 2006/0020842 A1 | 1/2006 | Olsen et al. |
| 2007/0005995 A1 | 1/2007 | Kardach et al. |
| 2009/0150696 A1 | 6/2009 | Song et al. |
| 2010/0274940 A1 | 10/2010 | Ahmad et al. |
| 2011/0040915 A1 | 2/2011 | Strauss et al. |
| 2012/0210104 A1 | 8/2012 | Danko |
| 2015/0134867 A1 | 5/2015 | Hildner |
| 2017/0161096 A1* | 6/2017 | Loh ......................... G06F 13/24 |

* cited by examiner

DEFERRED INTER-PROCESSOR INTERRUPTS

This application is a continuation of co-pending U.S. application Ser. No. 14/867,770, filed Sep. 28, 2015, which is a continuation of U.S. application Ser. No. 13/741,811 filed on Jan. 15, 2013, now issued as U.S. Pat. No. 9,208,113.

BACKGROUND

The embodiments of the present invention relate to processing systems that have two or more processors, such as two or more processor cores, and particularly relate to those processing systems in which one of the processors or processor cores can be executing instructions or otherwise operating while another processor or processor core can be in a low power state such as a low power sleep state in which processing is reduced or totally eliminated.

A common chain of events in modern computing operating systems can start with a hardware interrupt that causes a first processor to wake up (from a low power sleep state) and execute an interrupt handler. This in turn causes a thread to be made runnable to which the scheduler responds by executing that thread. In multi-processor systems, the operating system must make choices about when to wake up additional processors, particularly when the first processor receives a new interrupt while it is already processing an interrupt and while a second processor is in a low power sleep state. If the first processor chooses not to wake up the second (or other additional) processors, then the execution of the newly runnable thread will be delayed while the first processor continues processing any interrupts. This adds scheduling latency to the newly runnable thread, but potentially avoids waking up the second processor that may have nothing to do. Most of the time this added latency is short, but in a busy system, additional interrupts could delay the thread significantly. If the operating system chooses to wake up the second processor or additional processor as soon as the thread is made runnable, the thread will see minimal scheduling latency. However, if the interrupt processing on the first processor completes quickly, the original processor (the first processor) will then be left with nothing to do and be put back to sleep. In effect, two processors would be woken up to do one processor's amount of work. Both of these strategies are used in modern operating systems, depending on the expected workload and desired balance between performance and power efficiency.

SUMMARY OF THE DESCRIPTION

A multi-processor system uses, in one embodiment, a deferred inter-processor interrupt (IPI) that is issued by a first processor. The deferred IPI can be cancelled, and if it is not cancelled it wakes up a second processor. The deferred IPI is issued by the first processor in response to a new interrupt that is, in one embodiment, received while the first processor is processing a previously received interrupt. If the first processor can complete processing of the previously received interrupt before a timer, started by the deferred IPI, times out, then the first processor can handle the new interrupt and can cancel the deferred IPI.

In one embodiment, a method to process interrupts in a multi-processor system which includes at least a first processor and a second processor and an interrupt controller that is coupled to both processors, can include: receiving at the first processor, from the interrupt controller, a first interrupt and processing the first interrupt with an interrupt handler that is executing on the first processor while the second processor is in a low power sleep state, the processing of the first interrupt creating a runnable thread or otherwise making a thread runnable; requesting, by the first processor in response to the creation of the runnable thread, a deferred inter-processor interrupt (IPI) by sending a deferred IPI to the interrupt controller; starting a timer in the interrupt controller in response to the deferred IPI; and cancelling the deferred IPI in response to determining, before the timer in the interrupt controller times out, that the first processor is available to execute the runnable thread, the cancelling including sending a cancel signal, to cancel the deferred IPI, from the first processor to the interrupt controller. In the event that the timer does time out, the method can also include waking up the second processor from the low power sleep state in response to the timer timing out and also assigning the runnable thread to the second processor for processing on the second processor. In one embodiment, the interrupt handler executing in the first processor cannot be interrupted but a thread in either of the first processor or the second processor can be interrupted. In one embodiment, a scheduler software component in the operating system which is executing on the first processor requests the deferred IPI. Also in one embodiment, the deferred IPI can specify a time value (or a value which is representative of time) to be used by the timer in the interrupt controller to set a timeout period. In another embodiment, the interrupt controller can provide its own time value and does not require a time value or a time representative value from the processor. In one embodiment, the first processor processes the runnable thread after cancelling the deferred IPI. In one embodiment, the multiple processor system has no priority scheme for interrupts. In one embodiment, the first processor cancels the deferred IPI by sending a cancel indicator or cancel signal to the interrupt controller which changes the value in a cancel register of the interrupt controller, thereby preventing the deferred IPI from being sent by the interrupt controller to the other processor. In one embodiment, the interrupt controller can include a plurality of registers to store indicators or parameters for a deferred IPI, such as an indicator that indicates a deferred IPI is to be sent when a corresponding timer expires unless a cancel indicator has been stored in a cancel register.

The embodiments described herein also include systems which perform one or more of the methods described herein and also include machine readable non-transitory storage media that store executable program instructions which, when executed by a data processing system having at least two processors, cause the data processing system to perform any one of the methods described herein.

The above summary does not include an exhaustive list of all embodiments. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
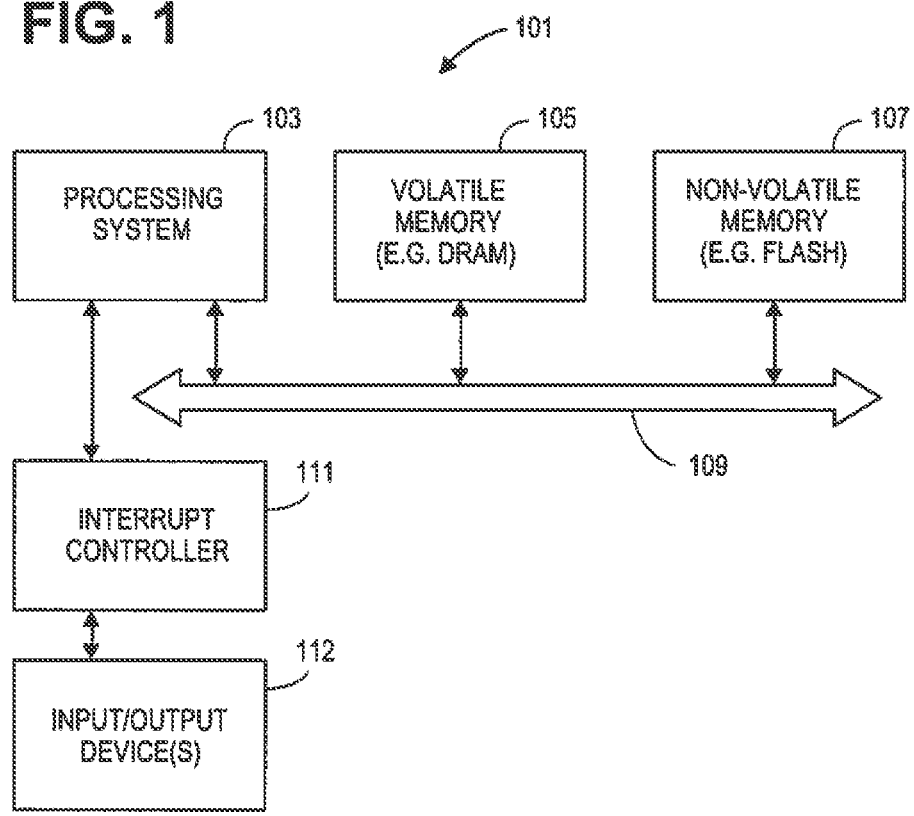
FIG. 1 shows an example of a data processing system which can be used in one or more embodiments.

FIG. 1 shows an example of a system in which an interrupt controller is used to provide interrupts from one or more input/output (I/O) devices, such as one or more input devices or one or more output devices, etc., or interrupts generated as a result of the execution of one or more software applications or interrupts from one or more hardware timers or one or more hardware timers that was set by the one or more software applications. The I/O devices 112 can be a display which has an integrated touch screen or touch panel for receiving multi-touch inputs or can be a mouse or a keyboard or a touchpad or trackpad or other input or output devices as are known in the art. Interrupt controller 111 provides interrupts in the manner known in the art as a result of signals from the I/O devices 112. In turn, the interrupt controller 111 provides one or more interrupts to processing system 103 which can include a multi-processor system, such as a microprocessor which includes multiple processing cores, etc. Processing system 103, in one embodiment, is coupled to one or more system busses, such as bus 109 which couples the processing system 103 with volatile memory 105 and non-volatile memory 107. Volatile memory 105 can be conventional DRAM and non-volatile memory 107 can be non-volatile semiconductor memory such as flash memory, or magnetic hard drive, etc. As is known in the art, interrupts provided by interrupt controller 111 cause processing system 103 to respond to inputs from an input device, such as any one of the input devices 112 to thereby cause the system to respond to the input on the input device or to respond to interrupts from other sources such as interrupts from a timer such as a hardware timer that was set by one or more software applications.

Figure 2:
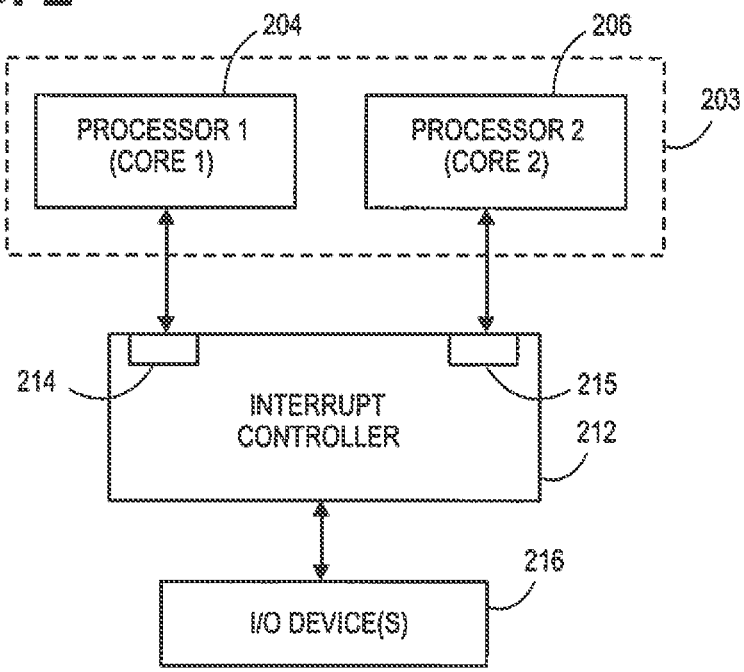
FIG. 2 shows an example of a data processing system that includes an interrupt controller that can provide a deferred inter-processor interrupt.
Figure 4:
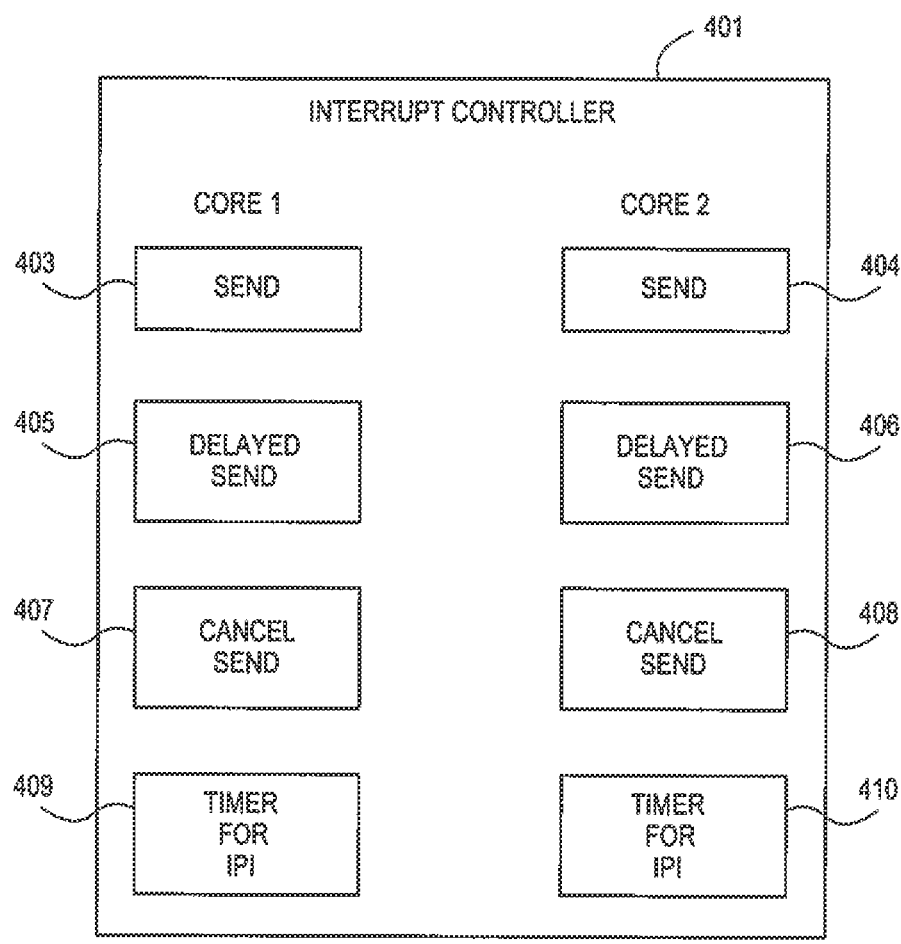
FIG. 4 shows an embodiment of an interrupt controller that can provide a deferred inter-processor interrupt.

FIG. 2 shows a more detailed example of a multiple processing system 203 which uses and is coupled to an interrupt controller 212 which provides interrupts to both processors, such as processor 204 and processor 206 in the processing system 203. Interrupt controller 212 is coupled to receive interrupts from input devices 216 and/or interrupts from one or more hardware timers in the manner known in the art and can also be coupled to receive interrupts generated as a result of execution of one or more software applications. The interrupts generated by the input devices 216 are provided to the interrupt controller 212 which in turn can provide one or more interrupts to one or both of the processors 204 and 206 in the processing system 203. As is known in the art, the interrupt controller 212 can include a set of registers that provide information for an interrupt handler (or other software) executing in software on one or both of the processors 204 and 206. Registers 214 provide information about interrupts to processor 204 and registers 215 provide information about interrupts to processor 206. In at least some embodiments, additional registers are provided in the interrupt controller 212 in order to accommodate the deferred IPI, and examples of these additional registers are shown in FIG. 4 and will be described further below. It will be appreciated that the processors 204 and 206 can be on different integrated circuits or can be on the same integrated circuit and that the interrupt controller can also be on the same integrated circuit that contains processors 204 and 206.

Figure 3:
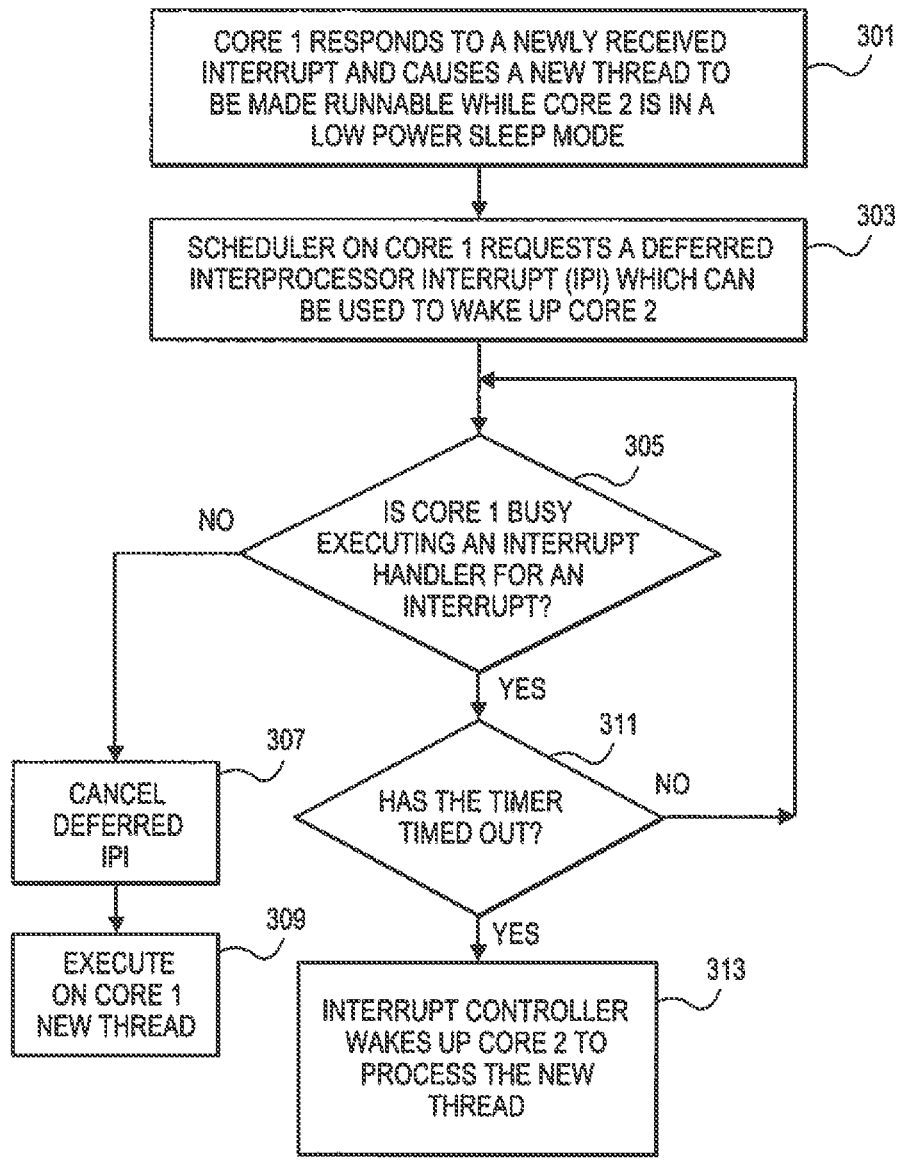
FIG. 3 is a flowchart which shows a method according to one embodiment.

FIG. 3 shows an example of a method of providing, in a multi-processor system, for a deferred inter-processor interrupt (IPI). A multi-processor system, such as system 203 can use, in one embodiment, the deferred IPI that is issued by a first processor, such as processor 204. The deferred IPI can be cancelled by the first processor, and if it is not cancelled then the deferred IPI can wake up a second processor, such as processor 206. In one embodiment, the deferred IPI is issued by the first processor in response to the creation of a new runnable thread that is, in one embodiment, made runnable (e.g., executable) by the first processor, such as processor 204, in response to the previously received interrupt. Operation 301 shown in FIG. 3 is an example in which a first processor, referred to as core 1, responds to a newly received interrupt and causes a new thread to be made runnable in response to the newly received interrupt while the other processor, referred to as core 2, is in a low power sleep mode. Operation 301 can occur, for example, in the case of FIG. 2 while processor 206 is asleep and processor 204 is processing an existing interrupt. In the example of FIG. 2, the interrupt controller 212 receives a newly received interrupt from an input device (or from a timer interrupt created by a software application) and transmits an interrupt signal to the processor 204 which causes a new thread to be made runnable while processor 206 remains in a low power sleep mode. The new thread can be a thread that is configured to service or respond to the newly received interrupt. In response to the newly created runnable thread, a scheduler, in operation 303, on the first processor or core 1 requests a deferred inter-processor interrupt (IPI) which can be used to wake up the second processor or core 2. In one embodiment, the scheduler can be a software component that is part of the operating system, and a deferred IPI can include one or more parameters that specify a time or a time representative value which is used by a timer in the interrupt controller.

The request of the deferred IPI can occur by the first processor or core 1 processor sending a signal representing the deferred IPI to the interrupt controller which transmitted the newly received interrupt that was responded to in operation 301. For example, referring back to FIG. 2, core 1 or processor 204 can send a deferred IPI signal to interrupt controller 212, and this signal can provide one or more values stored in one or more registers, such as registers 214 in the interrupt controller 212. If the deferred IPI includes values representing time, then those times can be used in the timer in the interrupt controller. In one embodiment, the timer is used to determine when to send the deferred IPI to another processor, such as the core 2 processor or processor 206 shown in FIG. 2.

Following the requesting of the deferred IPI in operation 303, the processing system can then determine in operation 305 whether or not the processor which requested the deferred IPI is still busy executing other instructions (such as a non-interruptible interrupt handler) and therefore cannot process the newly created runnable thread (or other task, process, or thread). In one embodiment, operation 305 can involve, for example, determining whether or not the core 1 processor is still busy executing an interrupt handler for one or more interrupts. The core 1 processor requested the deferred IPI in operation 303 because it was busy executing other instructions, such as the interrupt handler for an interrupt (such as an interrupt received immediately before or after the runnable thread was created). If operation 305 determines that the core 1 processor is no longer busy executing other instructions, then operation 307 follows in which the core 1 processor sends a signal to the interrupt controller in operation 307 to cancel the previously requested deferred IPI. After cancelling this previously requested deferred IPI, then the core 1 processor can process the new thread that was made runnable in operation 301.

The foregoing sequence of operations avoided the immediate wakeup of the second processor upon receiving the newly received interrupt in operation 301 by using a deferred inter-processor interrupt which does not immediately trigger an inter-processor interrupt to the other processor to wake up the other processor; rather, it uses a timer to determine when to send the inter-processor interrupt. In one embodiment, the timer is implemented in the interrupt controller and can be implemented as a hardware timer or as a timer which is using software running on hardware to provide a timer. The timer, in effect, determines the period of time to defer the deferred IPI, and there are numerous ways known in the art to implement a timer, and each of those ways can be used with any one of the embodiments described herein. In one embodiment, the deferred IPI itself can specify a time value or a value representative of time, such as a selected number of microseconds, or clock cycles or other cycles etc. In another embodiment, the interrupt controller itself can provide time values or values representative of time. In one embodiment, the time value itself may be variable or selectable such that the timer can select a time value from a set of possible time values depending upon the circumstance. For example, if the wakeup operation of a sleeping processor is long, then a longer time value may be selected. In a system which has different types of processors with different types of wakeup times, then the time value selected may depend upon the wakeup time of the particular processor. In another embodiment, the time value may depend upon an energy consumption parameter for a particular processor, particularly where there are different types of processors or processors that consume different amounts of power. In this case, time values which are longer may be used for processors which consume more power than other processors which consume less power such that the more power hungry processors are deferred or delayed before their wakeup with a deferring period that is longer than processors that consume less power. As shown by the sequence of operations through operation 309, the processor which created the new runnable thread can cancel the deferred IPI and thereby execute the new runnable thread without having to wake up another processor, and hence the system avoids a spurious processor wakeup operation which in fact was not necessary.

Referring back to FIG. 3, if in operation 305 it is determined that the first processor (referred to as core 1) is in fact still busy executing other instructions, such as an interrupt handler for a previously or newly received interrupt, then the system proceeds to operation 311 in which it is determined whether or not the timer has timed out. As noted above, the timer can, in one embodiment, be implemented as either a hardware timer or a software and hardware timer in the interrupt controller, such as interrupt controller 212 or interrupt controller 401 shown in FIG. 4. If the timer has not timed out, then operation 311 returns the system back to operation 305 which at some point again checks to determine whether or not the first processor is still busy executing other instructions. If it is determined in operation 311 that the timer has timed out, then operation 313 follows operation 311, and in operation 313, the interrupt controller sends the deferred IPI to the second processor, such as processor 206 which causes that processor to wake up in order to process the new thread which was made runnable by the newly received interrupt which was received in operation 301.

The method shown in FIG. 3 provides a way to balance the servicing of interrupts (with a latency that is related to the time value used by the timer) while also avoiding unnecessary wakeups which consume extra power when in fact the original processor will get to the newly received interrupt within the latency defined by the timeout period of the timer. One or more embodiments of this method can be particularly useful in systems in which an interrupt handler on a processor cannot be interrupted during its execution even though a non-interrupt thread can be interrupted as is the case with many modern operating systems. Furthermore, the one or more embodiments described herein can be useful in operating systems in which there are no priority schemes for interrupts. For example, in many operating systems there is only one interrupt level and all interrupts and timers are considered equally.

On processors and interrupt controllers which, in one embodiment, support generation of a non-maskable timer interrupt, software can trigger a deferred IPI through a different mechanism that is similar to the embodiments described herein. When software executing on the first processor makes a thread runnable on such a system, it can subsequently program a non-maskable timer with a desired deadline corresponding to a desired maximum scheduling latency. If the first processor completes its interrupt handling or thread execution and the software is hence able to dispatch and execute the newly runnable thread on the first processor before the desired deadline then the non-maskable timer can be cancelled. If, on the other hand, the deadline expires and the first processor is still executing an interrupt handler or executing a thread that may have masked interrupts, the non-maskable timer interrupt will occur and this causes the handler for the non-maskable timer interrupt to subsequently examine the software state to identify pending runnable threads and generate an IPI to the appropriate other processor (second, third, etc. processor), which may have been preselected earlier or selected within the context of the non-maskable timer interrupt. This effect may also be achievable on processors and interrupt controllers that support multiple programmable priorities for timer interrupts and processing of nested interrupts.

FIG. 4 shows an example of an interrupt controller 401 which can be used in one or more of the embodiments described herein. For example, the interrupt controller 401 may be used as the interrupt controller 212 shown in FIG. 2. The interrupt controller shown in FIG. 4 can also be used to implement the method shown in FIG. 3 or variations of that method that have been described herein. The interrupt controller 401 can include, for each processor that it provides interrupts for, a set of registers to store or provide values for the management of interrupts. For example, core 1 processor can include a set of registers such as a send register 403, a delay send register 405, a cancel send register 407, as well as a timer 409 for a deferred IPI. Similarly, the interrupt controller 401 can also include a set of registers for other processors, such as the core 2 processor as shown in FIG. 4, and this can include a send register 404, a delayed send register 406, a cancel send register 408, and a timer, such as timer 410 for a deferred IPI. In one embodiment, the interrupt controller 401 may have a single timer rather than having multiple timers for each of the cores. The send register, such as send register 403 or send register 404 can store values relating to an interrupt which are to be sent immediately; for example, the send register 403 can include values relating to an inter-processor interrupt which is to be sent immediately to the core 2 processor. The delayed send register 405 can store values for a deferred IPI which will be sent to the core 2 processor after the timer expires unless, prior to the timer expiring, the deferred IPI is cancelled by storing the cancel indicator in the cancel register 407. The set of registers 404, 406, and 408, can work in the same way as their corresponding register in the other set of registers for core 1. For example, the delayed send register 406 can store values relating to a deferred IPI to be sent to the core 1 processor which is asleep when the timer 410 expires and no cancel signal has been stored in the cancel register 408. The send register 404 can store values related to an interrupt to be sent immediately to processor core 1 using conventional techniques that are known in the art.

Figure 5:
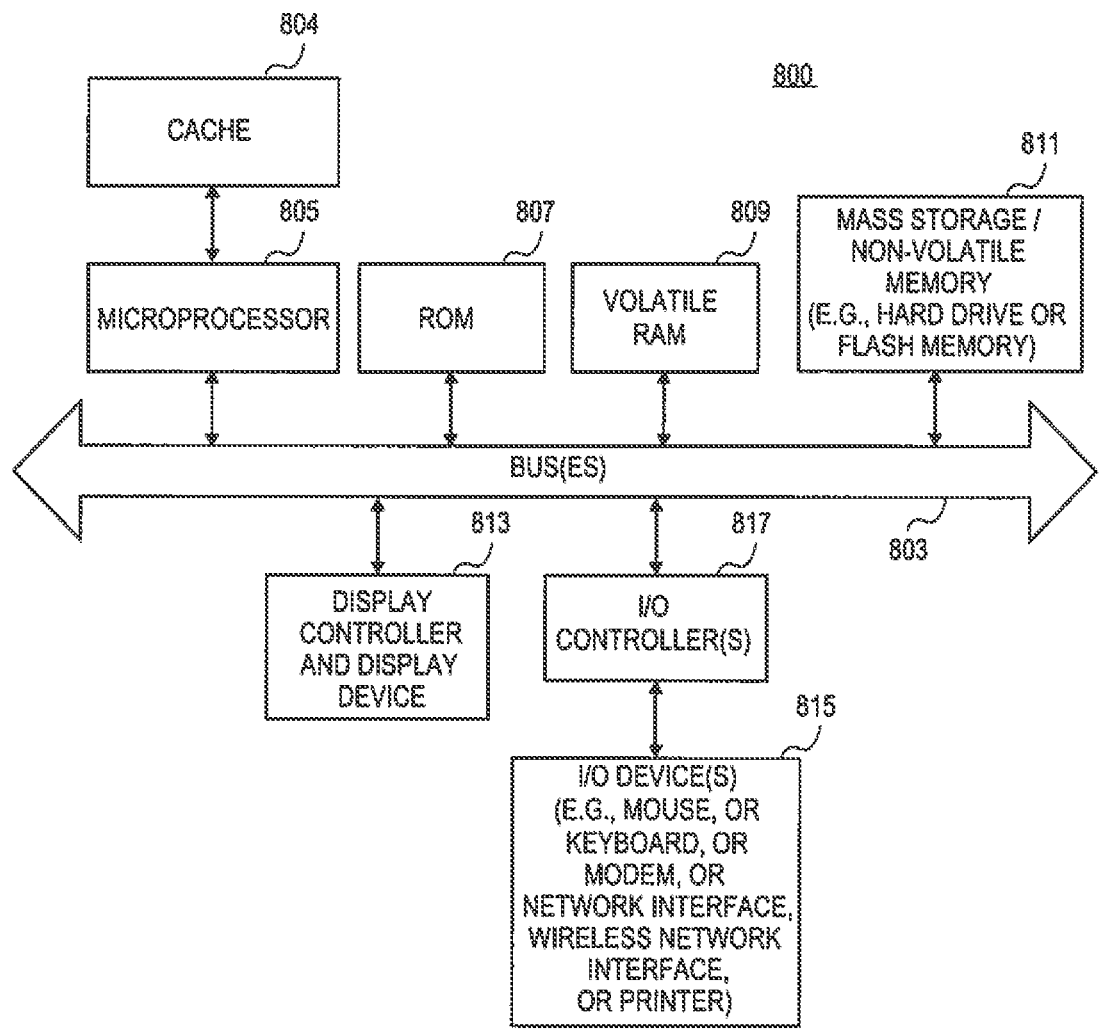
FIG. 5 shows an example of a data processing system that can be used in one or more embodiments.

FIG. 5 shows one example of a data processing system, which may be used with one embodiment. Note that while FIG. 5 illustrates various components of a data processing system, it is not intended to represent any particular architecture or manner of interconnecting the components as such details are not germane to the present invention. It will also be appreciated that network computers, tablet computers, and other data processing systems which have fewer components or perhaps more components may also be used with the present invention.

As shown in FIG. 5, the computer system 800, which is a form of a data processing system, includes a bus 803 which is coupled to one or more microprocessor(s) 805 and a ROM (Read Only Memory) 807 and volatile RAM 809 and a non-volatile memory 811. The microprocessor 805 can be a multi-core processor and can be coupled to optional cache 804. The microprocessor 805 can be similar to processing system 203 which has at least two processor cores, both of which are coupled to an interrupt controller (not shown in FIG. 5), such as interrupt controller 212. In one embodiment, an interrupt controller in the system shown in FIG. 5 provides a deferred IPI to each processing unit, such as a processing core, in the microprocessor 805. The microprocessor 805 may retrieve the stored instructions from one or more of the memories 807, 809 and 811 and execute the instructions to perform operations described above. These memories represent examples of machine readable non-transitory storage media that can store or contain computer program instructions which when executed cause a data processing system to perform the one or more methods described herein. The bus 803 interconnects these various components together and also interconnects these components 805, 807, 809 and 811 to a display controller and display device 813 and to peripheral devices such as input/output (I/O) devices 815 which may be one or more of mice, touch screens, touch pads, touch sensitive input devices, keyboards, modems, network interfaces, printers and other devices which are well known in the art. Typically, the input/output devices 815 are coupled to the system through input/output controllers 817 and these I/O controllers can be coupled, as is known in the art, to an interrupt controller that is also coupled to microprocessor 805. The volatile RAM (Random Access Memory) 809 is typically implemented as dynamic RAM (DRAM) which requires power continually in order to refresh or maintain the data in the memory.

The mass storage 811 can be typically a magnetic hard drive or a magnetic optical derive or an optical drive or a DVD RAM or a flash memory or other types of memory system which maintain data (e.g., large amounts of data) even after power is removed from the system. Typically the mass storage 811 will also be a random access memory although this is not required. While FIG. 5 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

It will be appreciated that additional components, not shown, may also be part of the system 800 in certain embodiments, or system 800 may have fewer components than shown in FIG. 5. The data processing system shown in FIG. 5 may be a handheld computer, a desktop computer, a laptop computer, or a tablet computer such as an iPad or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 800 may be a network computer or an embedded processing device within another device, or a consumer electronic device or other types of data processing systems which have fewer components or perhaps more components than that shown in FIG. 5.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system comprising:
a first processor;

a second processor; and an interrupt controller coupled to the first processor and to the second processor, the interrupt controller having a delayed inter-processor interrupt (IPI) register that is configured, when set by the first processor, to indicate that the first processor has requested a delayed IPI, and the interrupt controller having a timer to determine when a predetermined time period expires, the predetermined time period starting in response to the interrupt controller receiving the delayed IPI, and the interrupt controller being configured to wake up the second processor and to assign a runnable thread to the second processor to process the runnable thread when the timer having the predetermined time period expires, wherein the interrupt controller is coupled to one or more devices or sources to receive interrupts for processing, wherein cancellation of the delayed IPI is in response to the first processor becoming available to process the runnable thread before the timer having the predetermined time period expires.

2. The system as in claim 1 wherein the interrupt controller comprises a cancel indicator that is configured to receive a cancel signal from the first processor to cancel the delayed IPI, and wherein when the predetermined time period of the timer expires and the cancel signal has not been received, the interrupt controller wakes up the second processor and assigns the runnable thread to the second processor for processing.

3. The system as in claim 1 wherein an interrupt handler in the first processor cannot be interrupted but a thread in either of the first processor or the second processor can be interrupted.

4. The system as in claim 1 wherein a scheduler, executing on the first processor, requests the delayed IPI.

5. The system as in claim 1 wherein the delayed IPI specifies the predetermined time period to be used by the timer to set a time out period.

6. The system as in claim 1 wherein the timer provides the predetermined time period to be used by the timer.

7. The system as in claim 1 wherein the first processor processes the runnable thread after cancelling the delayed IPI.

8. The system as in claim 1 wherein the data processing system has no priority scheme for interrupts.

* * * * *